US012806947B2

(12) United States Patent
Taylor et al.

(10) Patent No.: US 12,806,947 B2
(45) Date of Patent: Nov. 24, 2026

(54) MOVABLE TOW HOOK ASSEMBLIES AND VEHICLES INCLUDING SAME

(71) Applicant: Toyota Motor Engineering & Manufacturing North America, Inc., Plano, TX (US)

(72) Inventors: Joseph C. Taylor, Ypsilanti, MI (US); Aaron R. Steinhilb, Milan, MI (US); Phouvadol P. Khouphongsy, Saline, MI (US); Troy N. Grantham, Saline, MI (US); Haley L. Grantham, Saline, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA, Toyota (JP)

( * ) Notice: Subject to any disclaimer, the term of this patent is extended or adjusted under 35 U.S.C. 154(b) by 328 days.

(21) Appl. No.: 18/632,470

(22) Filed: Apr. 11, 2024

(65) Prior Publication Data

US 2025/0319730 A1 Oct. 16, 2025

(51) Int. Cl.
*B60D 1/56* (2006.01)
*B60D 1/54* (2006.01)

(52) U.S. Cl.
CPC ............... *B60D 1/565* (2013.01); *B60D 1/54* (2013.01)

(58) Field of Classification Search
CPC ..................................................... B60D 1/565
USPC ......................................................... 280/495
See application file for complete search history.

(56) References Cited

FOREIGN PATENT DOCUMENTS

| | | | | |
|---|---|---|---|---|
| CN | 202345319 U | | 7/2012 |
| CN | 202368279 U | * | 8/2012 |
| CN | 208198316 U | | 12/2018 |
| CN | 213383759 U | | 6/2021 |
| DE | 202013012185 U1 | | 2/2016 |
| JP | 2011168077 A | | 9/2011 |

* cited by examiner

*Primary Examiner* — Kevin Hurley
*Assistant Examiner* — Felicia L. Brittman-Alabi
(74) *Attorney, Agent, or Firm* — Dinsmore & Shohl LLP

(57) ABSTRACT

A tow hook assembly including a housing having an aperture formed in a front wall of the housing, a tow hook at least partially extending through the aperture and movable between an extended position and a retracted position, and a biasing member configured to prohibit movement of the tow hook from the extended position to the retracted position until a force exceeding a predetermined force threshold in a direction opposite a towing direction is applied against a front end of the tow hook.

19 Claims, 5 Drawing Sheets

MOVABLE TOW HOOK ASSEMBLIES AND VEHICLES INCLUDING SAME

TECHNICAL FIELD

The present specification generally relates to tow hooks for vehicles and, more specifically, tow hooks that are configured to reduce contact with a barrier during a collision.

BACKGROUND

Current tow hooks may attach or be fixed to a vehicle at different connection points so that the tow hook is operable to remain on the vehicle while a towing force in a towing direction is applied to the tow hook. However, during a collision, the tow hook may contact an obstacle and apply a force in a direction opposite the towing direction that may cause further damage to internal components of the vehicle located rearward of the tow hook and to the obstacle.

Accordingly, a need exists for improved tow hooks that reduce damage to components of the vehicle as well as to an object contacted by the vehicle during the collision.

SUMMARY

In one embodiment, a tow hook assembly including: a housing having an aperture formed in a front wall of the housing; a tow hook at least partially extending through the aperture and movable between an extended position and a retracted position; and a biasing member configured to prohibit movement of the tow hook from the extended position to the retracted position until a force exceeding a predetermined force threshold in a direction opposite a towing direction is applied against a front end of the tow hook.

In another embodiment, a tow hook assembly includes: a housing having an aperture formed in a front wall of the housing; a tow hook at least partially extending through the aperture and movable between an extended position and a retracted position, a first detent formed in a surface of the tow hook, a second detent formed in the surface of the tow hook, and an inclined surface extending from the first detent to the second detent; and a biasing member extending from the housing and configured to prohibit movement of the tow hook from the extended position to the retracted position until a force exceeding a predetermined force threshold in a direction opposite a towing direction is applied against a front end of the tow hook, wherein a portion of the biasing member is received within the first detent when the tow hook is in the extended position, wherein the portion of the biasing member is received within the second detent when the tow hook is in the retracted position.

In yet another embodiment, a vehicle includes: a frame member; a bumper cover positioned forward of the frame member in a vehicle longitudinal direction, an opening formed in the bumper cover; and a tow hook assembly attached to the frame member, the tow hook assembly including: a housing having an aperture formed in a front wall of the housing; a tow hook at least partially extending through the aperture and movable between an extended position and a retracted position, the tow hook extending through the opening formed in the bumper cover when in the extended position; and a biasing member configured to prohibit movement of the tow hook from the extended position to the retracted position until a force exceeding a predetermined force threshold in a direction opposite a towing direction is applied against a front end of the tow hook.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
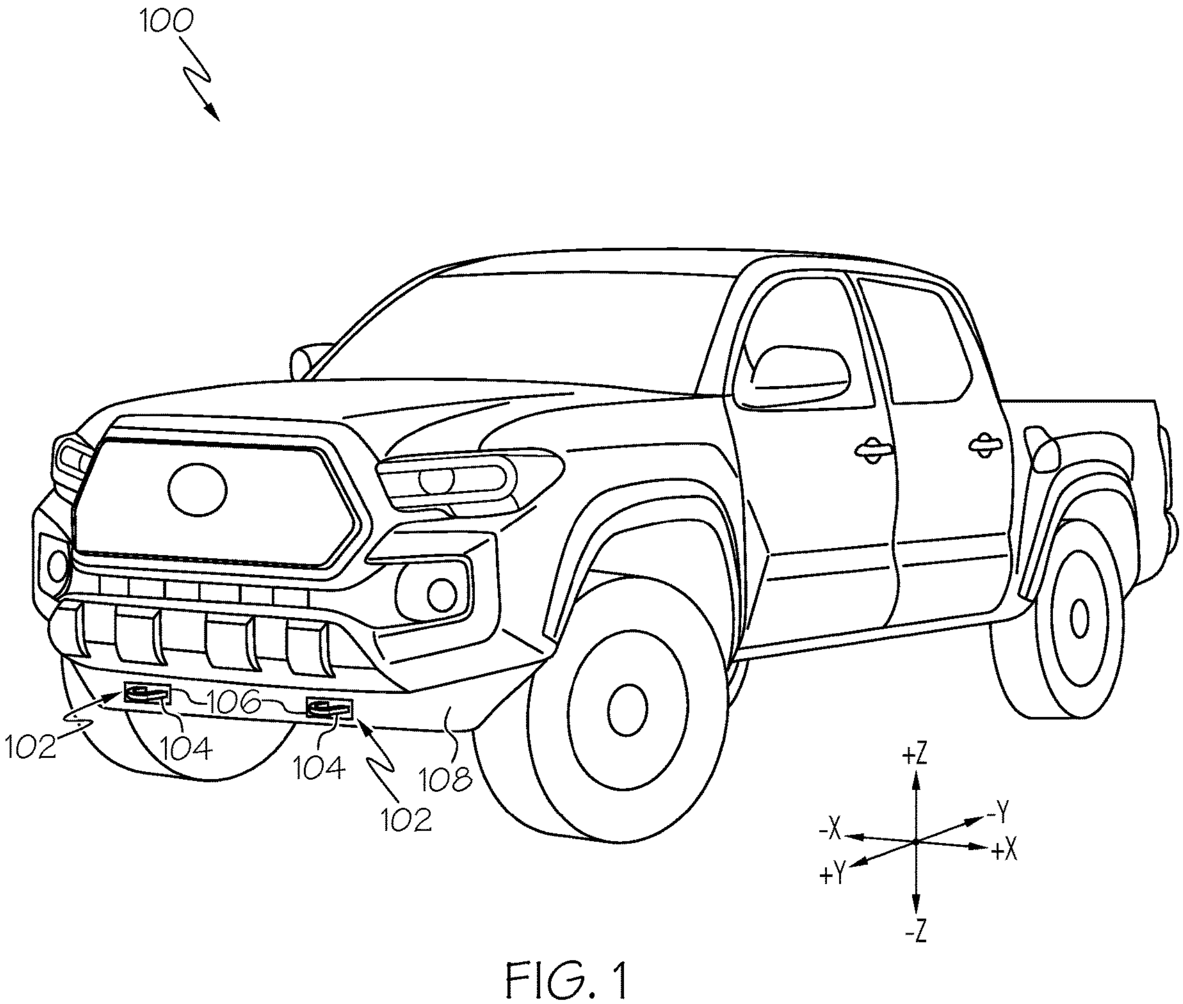
FIG. 1 schematically depicts a perspective view of a vehicle including a pair of tow hook assemblies, according to one or more embodiments shown and described herein.

Embodiments described herein are directed to movable tow hook assemblies and vehicles including movable tow hook assemblies. The tow hook assembly includes a housing having an aperture formed in a front wall of the housing, a tow hook at least partially extending through the aperture and movable between an extended position and a retracted position, and a biasing configured to prohibit movement of the tow hook from the extended position to the retracted position until a force exceeding a predetermined force threshold is applied against a front end of the tow hook in a direction opposite a towing direction. Various embodiments of the apparatus and operation of the apparatus are described in more detail herein. Whenever possible, the same reference numerals will be used throughout the drawings to refer to the same or like parts.

As used herein, the term "vehicle longitudinal direction" refers to the forward-rearward direction of the vehicle (i.e., in the +/−Y direction of the coordinate axes depicted in FIG. 1). The term "vehicle lateral direction" refers to the cross-vehicle direction (i.e., in the +/−X direction of the coordinate axes depicted in FIG. 1), and is transverse to the vehicle longitudinal direction. The term "vehicle vertical direction" refers to the upward-downward direction of the vehicle (i.e., in the +/−Z direction of the coordinate axes depicted in FIG. 1). As used herein, "upper" and "above" are defined as the positive Z direction of the coordinate axes shown in the drawings. "Lower" and "below" are defined as the negative Z direction of the coordinate axes shown in the drawings.

Referring now to FIG. 1, a perspective view of a vehicle 100 is depicted. As used herein, a vehicle 100 may refer to any instrument that is operable to transport people and/or goods from one location to another. For example, the vehicle 100 may include, but is not limited to, an automobile, car, bus, truck, boat, and the like. The vehicle 100 may comprise one or more tow hook assemblies 102. As shown in FIG. 1, the vehicle 100 includes a pair of tow hook assemblies 102. Each tow hook assembly 102 may be connected to any portion of the vehicle 100. For example, in some embodiments, the tow hook assemblies 102 may be attached to a frame member 124 or bumper beam of the vehicle 100, as shown in FIG. 2A.

More particularly, in embodiments, the tow hook assemblies 102 may be attached to extend above the frame member 124 of the vehicle 100. In other embodiments, the tow hook assemblies 102 may be attached to extend below the frame member 124 of the vehicle 100. For example, the tow hook assemblies 102 may be positioned to extend below the frame member 124 of the vehicle 100 such that a tow hook of the tow hook assembly 102 may be configured to receive a tow strap extending in a vehicle longitudinal direction below the frame member 124 of the vehicle 100.

In some embodiments, as shown in FIG. 1, the tow hook assemblies 102 may include a tow hook 104 extending in the vehicle longitudinal direction such that at least a portion of the tow hook 104, which is mounted to a vehicle body component as described in greater detail below, extends through an opening 106 formed in a bumper cover 108. The bumper cover 108 is positioned forward of the frame member 124 in the vehicle longitudinal direction such that the frame member 124 is not illustrated in FIG. 1.

Figure 2A:
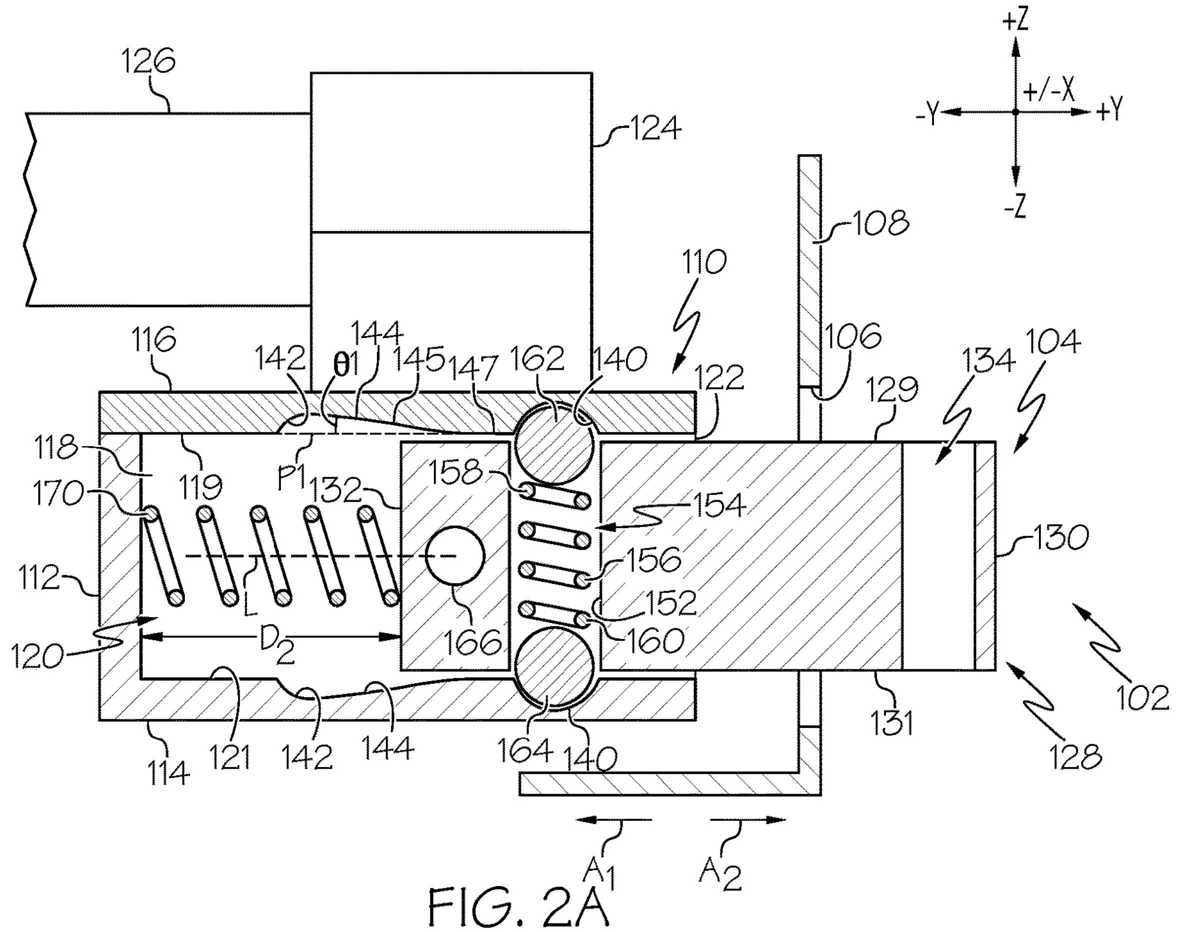
FIG. 2A schematically depicts a partial cross-sectional view of the tow hook assembly including a tow hook in an extended position, according to one or more embodiments shown and described herein.
Figure 4A:
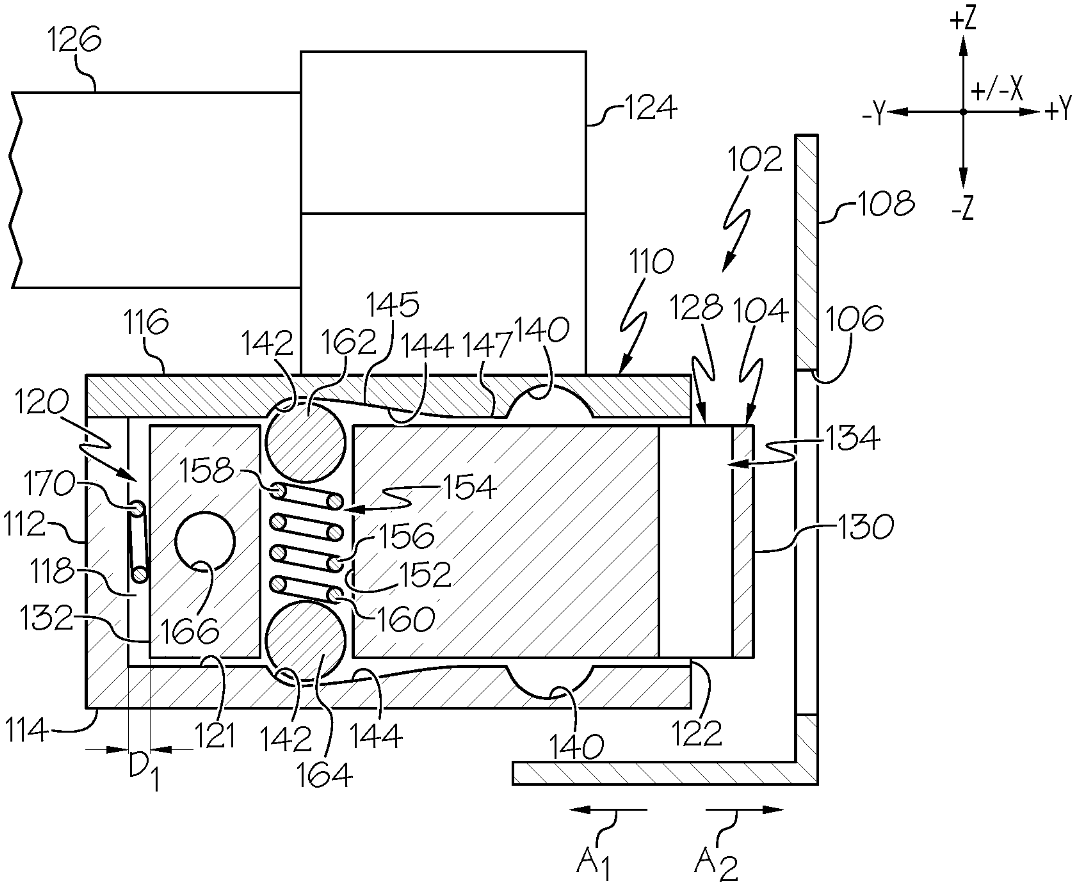
FIG. 4A schematically depicts a partial cross-sectional view of the tow hook assembly including the tow hook in a retracted position, according to one or more embodiments shown and described herein.

Referring now to FIG. 2A, the tow hook assembly 102 includes a housing 110 and the tow hook 104. The housing 110 includes a rear wall 112, a bottom wall 114, an upper wall 116 opposite the bottom wall 114, and a pair of side walls 118 that define an open interior 120. In embodiments, the housing 110 is a one-piece, monolithic structure. In other embodiments, the upper wall 116 is separately attached to the rear wall 112 and the pair of side walls 118. In other embodiments, each of the rear wall 112, the bottom wall 114, the upper wall 116, and the pair of side walls 118 are separately attached to one another. Accordingly, in embodiments, the housing 110 may not be a one-piece, monolithic structure. An aperture 122 is formed in the housing 110 opposite the rear wall 112 to permit the tow hook 104 to move between an extended position, as shown in FIG. 2A, and a retracted position, as shown in FIG. 4A, relative to the housing 110. Accordingly, the aperture 122 has any suitable geometry corresponding to a shape of the tow hook 104 such as, for example, circular, rectangular, or other regular or irregular shapes.

In embodiments, a first detent 140 is formed on at least one of an inner surface 119 of upper wall 116 and an inner surface 121 of the bottom wall 114 of the housing 110. In embodiments, a second detent 142 is formed on the at least one of the inner surface 119 of the upper wall 116 and the inner surface 121 the bottom wall 114 of the housing 110 rearward of the first detent 140 in the vehicle longitudinal direction. Additionally, in embodiments, an inclined surface 144 is formed on the at least one of the inner surface 119 of the upper wall 116 and the inner surface 121 of the bottom wall 114 of the housing 110 and extends between the first detent 140 and the second detent 142. As shown, the first detent 140, the second detent 142, and the inclined surface 144 are formed on each of the inner surface 119 of the upper wall 116 and the inner surface 121 of the bottom wall 114 of the housing 110. However, it should be appreciated that, in embodiments, the first detent 140, the second detent 142, and the inclined surface 144 are formed on the inner surface 119 of the upper wall 116 or the inner surface 121 of the bottom wall 114 of the housing 110. In other embodiments, the first detent 140, the second detent 142, and the inclined surface 144 are formed on an inner surface of at least one of the side walls 118.

The inclined surface 144 is oriented at an acute angle θ1 relative to a longitudinal plane P1 of the inner surface 119 extending parallel to a longitudinal axis L of the tow hook 104, i.e., parallel to the vehicle longitudinal direction. In embodiments, the acute angle θ1 is 20 degrees+/−10%. In embodiments, the acute angle θ1 is 20 degrees+/−20%. In embodiments, the acute angle θ1 is 20 degrees+/−30%. In embodiments, the acute angle θ is 20 degrees+/−40%. In embodiments, the acute angle θ1 is 20 degrees+/−50%. Additionally, the inclined surface 144 tapers inwardly toward the longitudinal axis L in a direction from the second detent 142 to the first detent 140. Stated another way, a thickness of the wall of the housing 110 proximate the first detent 140 is greater than a thickness of the wall of the housing 110 proximate the second detent 142. In embodiments, as shown in FIG. 2A, the angle at which the inclined surface 144 extends from the first detent 140 to the second detent 142 is not constant. For example, the inclined surface 144 may include a first inclined surface portion 145 extending from the second detent 142 oriented at the acute angle θ1 and a second inclined surface portion 147 extending between the first inclined surface portion 145 and the first detent 140 oriented substantially parallel to the longitudinal plane P1.

Figure 2B:
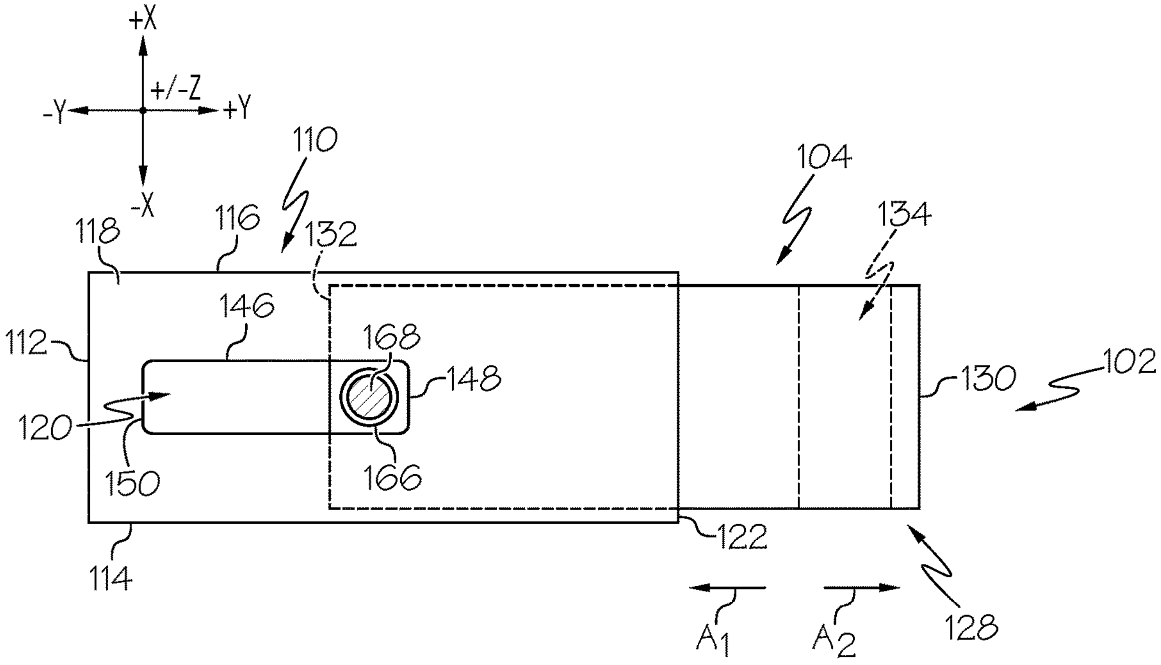
FIG. 2B schematically depicts a side view of the tow hook assembly including the tow hook in the extended position, according to one or more embodiments shown and described herein.

As shown in FIG. 2A, the first detent 140, the second detent 142, and the inclined surface 144 are formed in each of the inner surface 119 of the upper wall 116 and the inner surface 121 of the bottom wall 114 of the housing 110. As noted above, the upper wall 116 of the housing 110 may be formed separately from the other walls of the housing 110. Accordingly, this allows for easier access for machining the first detent 140, the second detent 142, and the inclined surface 144 in the housing 110. As shown in FIG. 2B, a slot 146 is formed in at least one of the side walls 118 of the housing 110. The slot 146 extends parallel to the vehicle longitudinal direction and has a front end 148 and a rear end 150 opposite the front end 148.

Referring still to FIG. 2A, the housing 110 is mounted to a frame member 124, such as the bumper beam, a crush box, or the like, in any suitable manner such as, for example, mechanical fasteners, clips, adhesive, welding, or the like. In embodiments, the upper wall 116 of the housing 110 is fixed to the frame member 124. As shown in FIG. 2A, the frame member 124 is provided rearward of the bumper cover 108.

A longitudinal rail 126 extends from the frame member 124 in the vehicle longitudinal direction opposite the bumper cover 108.

The tow hook 104 includes a tow hook body 128 having a front end 130 and a rear end 132 opposite the front end 130, an upper surface 129, and a lower surface 131 opposite the upper surface 129. As discussed herein, an outer peripheral shape of the tow hook body 128 has a shape corresponding to the aperture 122 formed in the housing 110 such that the tow hook body 128 is permitted to move through the aperture 122 and within the open interior 120 of the housing 110. In embodiments, a hole 134 is formed in the tow hook body 128 proximate the front end 130 to permit an attachment member such as, for example, a towing strap, hitch, or the like, to be secured to the tow hook 104. In other embodiments, the front end 130 of the tow hook body 128 itself may have any suitable shape or size such as, for example, a curved or hooked portion such that a tow strap may be secured directly thereto. In some embodiments, the front end 130 of the tow hook 104 has the shape of a hook.

In embodiments, a biasing channel 152 is formed within the tow hook body 128 and extends at least partially through the tow hook body 128 in the vehicle vertical direction. The biasing channel 152 is formed proximate the rear end 132 of the tow hook body 128, i.e., closer to the rear end 132 of the tow hook body 128 than to the front end 130 of the tow hook body 128.

A biasing member 154 extends through the biasing channel 152. In embodiments, the biasing member 154 includes a spring 156 and at least one bearing. The spring 156 has a first end 158 and a second end 160 opposite the first end 158. In embodiments in which the housing 110 includes a pair of first detents 140 and a pair of second detents 142, the biasing member 154 includes a first bearing 162 provided at the first end 158 to protrude through the upper surface 129 of the tow hook body 128, and a second bearing 164 provided at the second end 160 to protrude through the lower surface 131 of the tow hook body 128. In other embodiments in which the housing 110 includes only one first detent 140 and only one second detent 142, the biasing channel 152 may be formed to extend through the tow hook body 128 in the vehicle lateral direction. Additionally, in such embodiments, the biasing member 154 may extend only partially through the tow hook body 128 and may include a single bearing, such as the first bearing 162, provided at an end of the spring 156 located outside of the tow hook body 128 while the opposite end of the spring 156 is located within the tow hook body 128. In embodiments, the spring 156 is a coil spring. In other embodiments, the spring 156 is a resilient elastomeric member such as a compressible rubber, resilient plastic, or the like.

In embodiments, a pin channel 166 is formed within the tow hook body 128 and extends entirely through the tow hook body 128 in the vehicle lateral direction. The pin channel 166 is formed proximate the rear end 132 of the tow hook body 128, i.e., closer to the rear end 132 of the tow hook body 128 than to the front end 130 of the tow hook body 128. In embodiments, the pin channel 166 is formed between the biasing channel 152 and the rear end 132 of the tow hook body 128. However, in other embodiments, the pin channel 166 is provided on a side of the biasing channel 152 opposite the rear end 132 of the tow hook body 128. Additionally, the pin channel 166 may be formed to extend through the tow hook body 128 in the vehicle vertical direction. In other embodiments, the pin channel 166 may be formed within the tow hook body 128 to extend only partially through the tow hook body 128. Although the slot 146 is described herein as being formed in the housing 110 and the pin channel 166 is described herein as being formed in the tow hook body 128, in other embodiments, the slot 146 may be formed in the tow hook body 128 and the pin channel 166 may be formed in the housing 110.

In embodiments, a dampen member 170 extends between the rear end 132 of the tow hook body 128 and the rear wall 112 of the housing 110. The dampen member 170 may be any suitable device such as, for example, a coil spring, a resilient elastic member such as a compressible rubber, a resilient plastic, or the like. In embodiments, opposite ends of the dampen member 170 are fixed to the rear end 132 of the tow hook body 128 and the rear wall 112 of the housing 110, respectively. It should be appreciated that the dampen member 170 may be provided in embodiments in which the second detent 142 and the inclined surface 144 are not provided. However, the damping member 170 may be provided in embodiments in which the second detent 142 and the inclined surface 144 are provided.

It should be appreciated that when the tow hook 104 is positioned in the extended position, as shown in FIG. 2A, the tow hook body 128 extends through the opening 106 formed in the bumper cover 108 such that the hole 134 formed in the tow hook body 128 is entirely positioned at an exterior side of the vehicle 100. Additionally, as shown in FIG. 2A, when the tow hook 104 is positioned in the extended position, the first bearing 162 and the second bearing 164 of the biasing member 154 are each received within the first detent 140. Moreover, as shown in FIG. 2B, when the tow hook 104 is positioned in the extended position, the pin channel 166 formed in the tow hook body 128 is provided at the front end 148 of the slot 146 formed in the housing 110. In use, a pin 168 inserted through the pin channel 166 abuts against the front end 148 of the slot 146 to prevent further forward movement of the tow hook 104 relative to the housing 110. Stated another way, the pin 168 prevents movement of the tow hook 104 outside of movement between the extended position and the retracted position.

Figure 3:
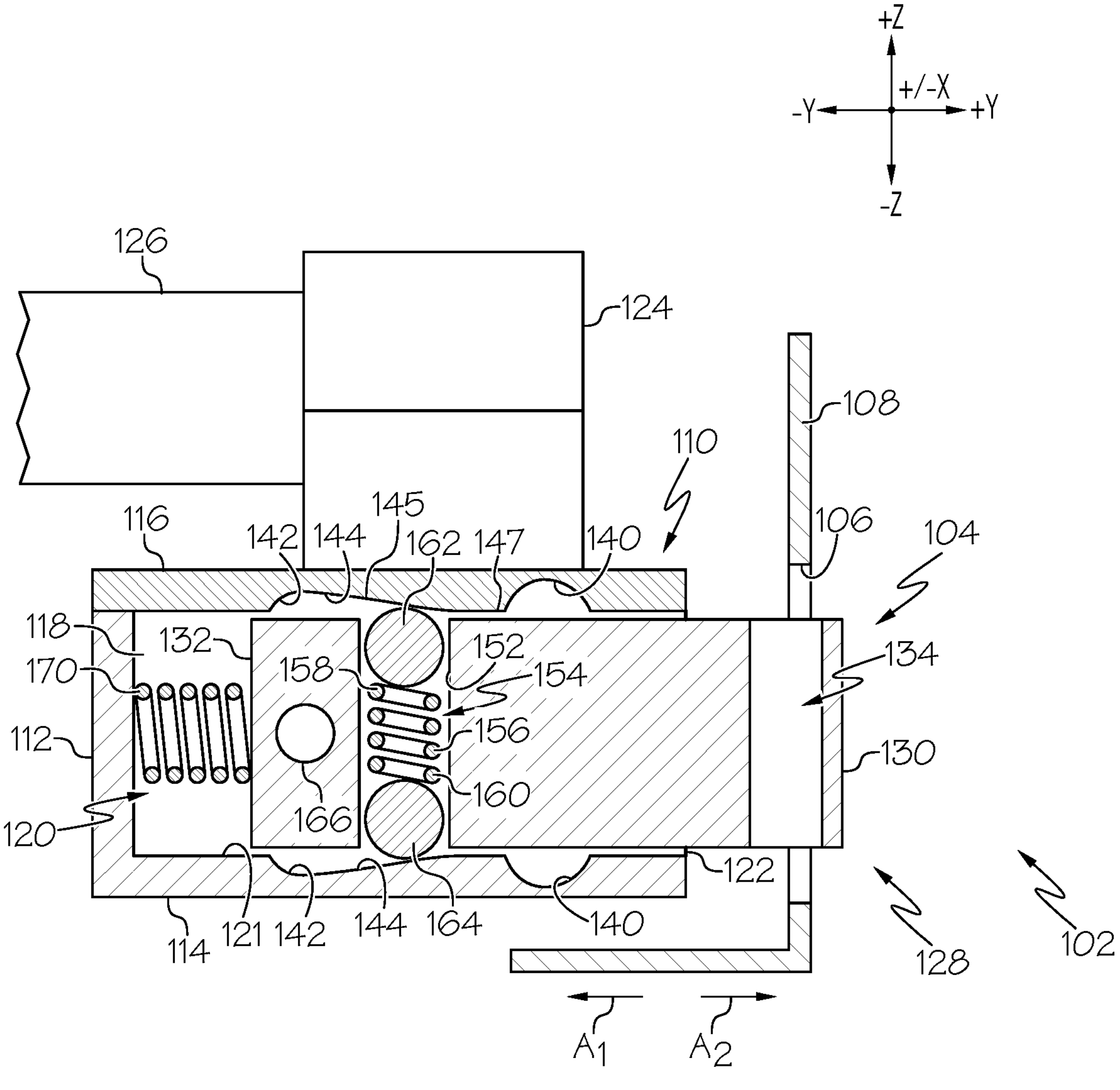
FIG. 3 schematically depicts a partial cross-sectional view of the tow hook assembly including the tow hook in an intermediate position, according to one or more embodiments shown and described herein.

Referring now to FIG. 3, the tow hook 104 is shown positioned in an intermediate position. Specifically, when a force exceeding a predetermined threshold is applied against the front end 130 of the tow hook body 128, the biasing member 154 is compressed such that the first bearing 162 and the second bearing 164 of the biasing member 154 are drawn out of the first detent 140. With the first bearing 162 and the second bearing 164 removed from the first detent 140, the tow hook body 128 is permitted to move rearwardly in the vehicle longitudinal direction, as depicted by arrow A1, which indicates a direction opposite a towing direction. Thus, in the intermediate position, the first bearing 162 and the second bearing 164 are positioned along the inclined surface 144 between the first detent 140 and the second detent 142. The inclined surface 144 encourages the biasing member 154 to extend back to an original uncompressed state. As the biasing member 154 extends, the tow hook body 128 is drawn further in the direction of arrow A1 toward the rear wall 112 of the housing 110 and toward the retracted position. Additionally, in embodiments in which the dampen member 170 is provided, the dampen member 170 compresses as the tow hook body 128 is drawn further in the direction of arrow A1 so as to dampen the movement of the tow hook body 128.

As described herein, the tow hook 104 is moved out of the extended position upon a force exceeding a predetermined threshold being applied against the front end 130 of the tow hook body 128. In embodiments, the predetermined force threshold is 1 kilonewton (kN)+/−10%. In embodiments, the predetermined force threshold is 1 kN+/−20%. In embodiments, the predetermined force threshold is 1 kN+/−30%. In embodiments, the predetermined force threshold is 1 kN+/−40%. In embodiments, the predetermined force threshold is 1 kN+/−50%. In embodiments, the predetermined force threshold is 10 kN+/−10%. In embodiments, the predetermined force threshold is 10 kN+/−20%. In embodiments, the predetermined force threshold is 10 kN+/−30%. In embodiments, the predetermined force threshold is 10 kN+/−40%. In embodiments, the predetermined force threshold is 10 kN+/−50%.

When the tow hook 104 is positioned in the retracted position, as shown in FIG. 4A, the tow hook 104 is further received within the open interior 120 of the housing 110 such that a distance D1 between the rear end 132 of the tow hook body 128 and the rear wall 112 of the housing 110 is less than a distance D2 between the rear end 132 of the tow hook body 128 and the rear wall 112 of the housing 110 when the tow hook 104 is in the extended position, as shown in FIG. 2A. Stated another way, when the tow hook 104 is in the extended position, the tow hook 104 extends farther outward from the housing 110 than when the tow hook 104 is in the retracted position.

Figure 4B:
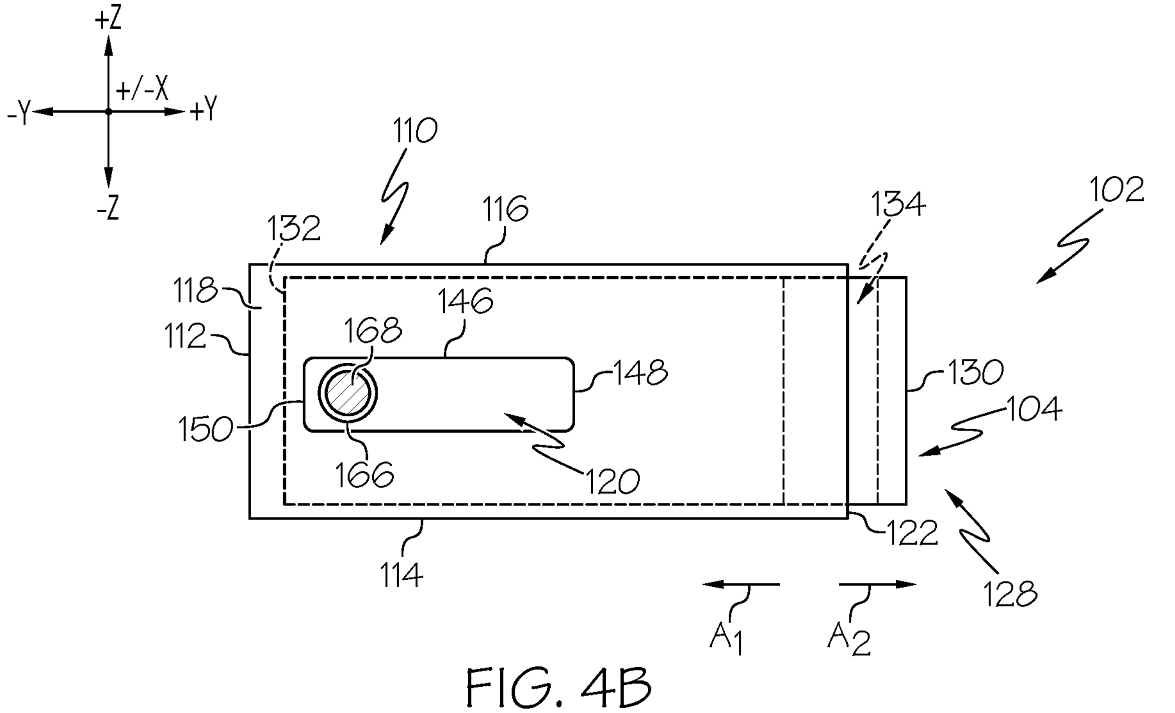
FIG. 4B schematically depicts a side view of the tow hook assembly including the tow hook in the retracted position, according to one or more embodiments shown and described herein.

Additionally, as shown in FIG. 4A, when the tow hook 104 is positioned in the retracted position, the first bearing 162 and the second bearing 164 of the biasing member 154 are each received within the second detent 142. As shown, the dampen member 170 is fully compressed between the rear end 132 of the tow hook body 128 and the rear wall 112 of the housing 110. Moreover, as shown in FIG. 4B, when the tow hook 104 is positioned in the retracted position, the pin channel 166 formed in the tow hook body 128 is provided at the rear end 150 of the slot 146 formed in the housing 110. In use, the pin 168 inserted through the pin channel 166 abuts against the rear end 150 of the slot 146 to prevent further rearward movement of the tow hook 104 relative to the housing 110.

When the tow hook 104 is in the retracted position, the tow hook body 128 may not extend through the opening 106 formed in the bumper cover 108 such that the hole 134 formed in the tow hook body 128 is positioned rearward of the bumper cover 108. However, it should be appreciated that, in embodiments, the tow hook body 128 may extend through the opening 106 formed in the bumper cover 108 when in the retracted position, but less than an amount of which the tow hook body 128 extends through the opening 106 formed in the bumper cover 108 when the tow hook 104 is in the extended position.

To reposition the tow hook 104 into the extended position from the retracted position, the tow hook 104 may be pulled such as, for example, by a user gripping the front end 130 of the tow hook body 128 or utilizing a tool to engage the hole 134 formed in the tow hook body 128, and pulling the tow hook 104 back through the aperture 122 formed in the housing 110 and through the opening 106 formed in the bumper cover 108 forward in the vehicle longitudinal direction, as depicted by arrow A2, which indicates the towing direction. Alternatively, in embodiments in which the dampen member 170 is provided, the tow hook 104 may be automatically repositioned into the extended position from the retracted position once a force against the front end 130 of the tow hook body 128 becomes less than a biasing force caused by the dampen member 170. Accordingly, no manual positioning of the tow hook 104 may be necessary to reposition the tow hook 104 into the extended position from the retracted position.

Figure 5:
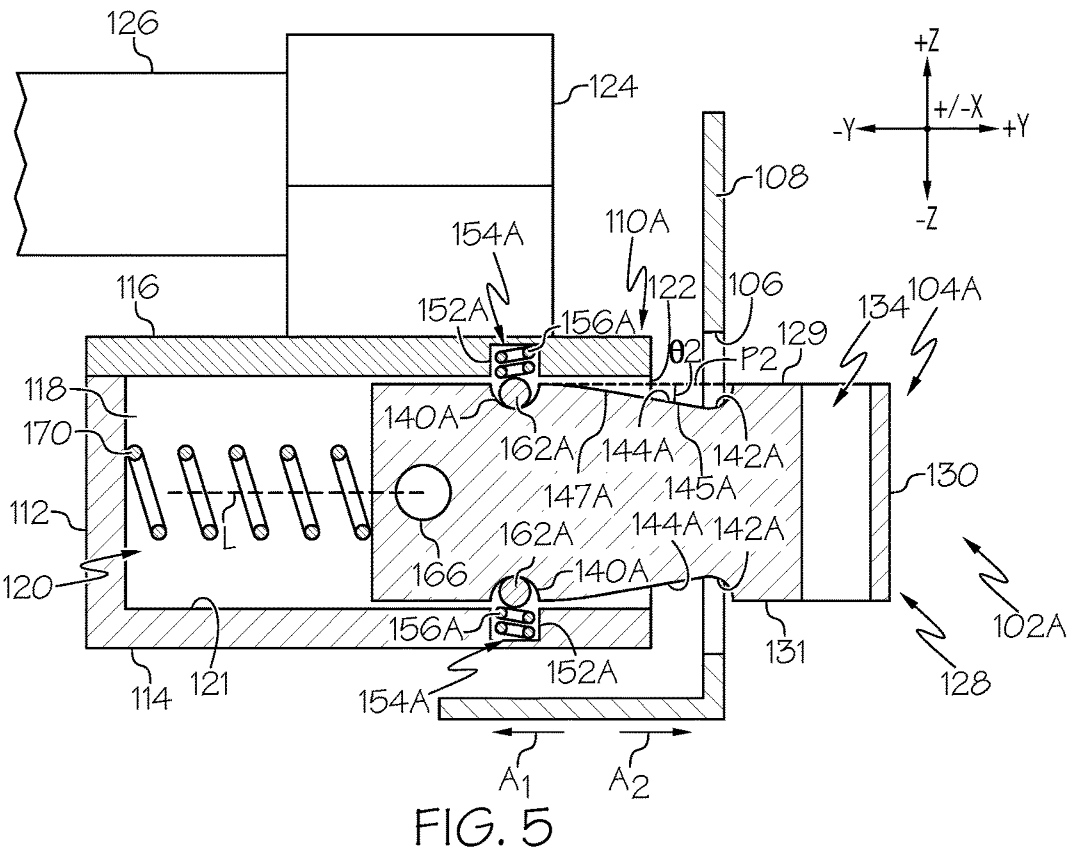
FIG. 5 schematically depicts a partial cross-sectional view of another tow hook assembly including a tow hook in an extended position, according to one or more embodiments shown and described herein.
Figure 6:
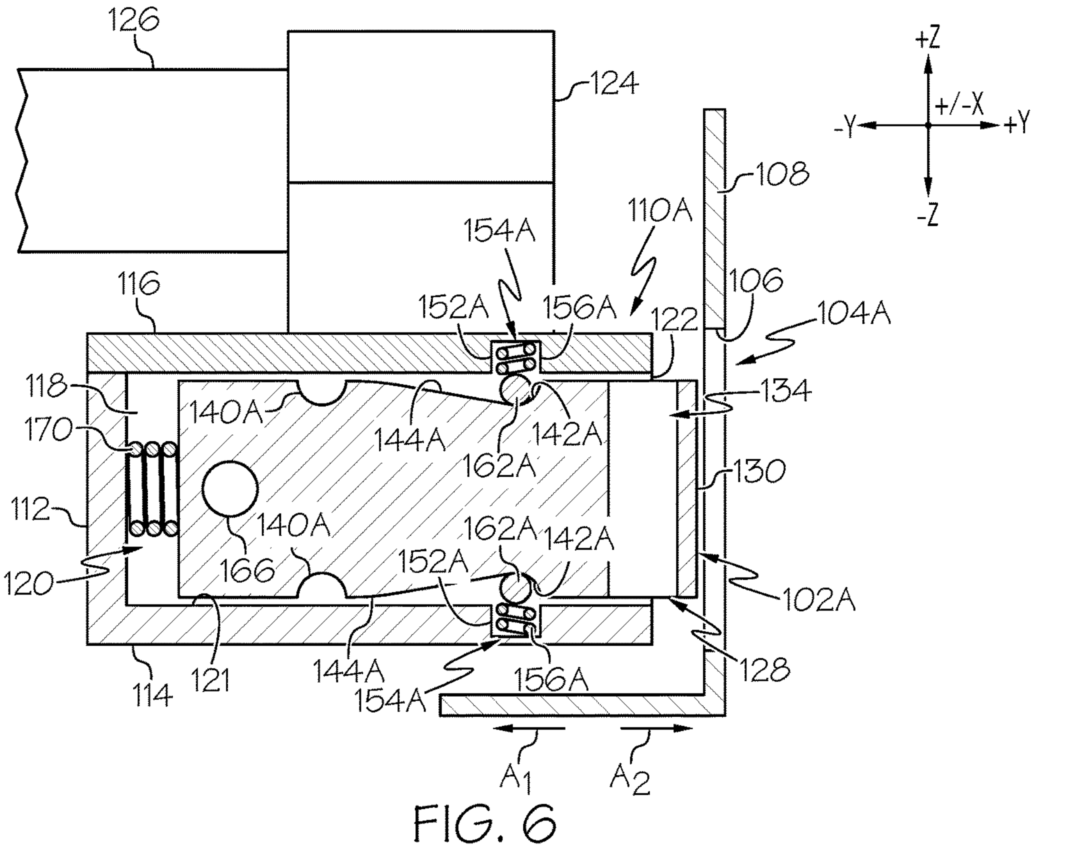
FIG. 6 schematically depicts a partial cross-sectional view of the tow hook assembly of FIG. 5 including the tow hook in a retracted position, according to one or more embodiments shown and described herein.

Referring now to FIGS. 5 and 6, another embodiment of a tow hook assembly 102A is depicted including a tow hook 104A and a housing 110A. It should be appreciated that the tow hook 104A and the housing 110A are substantially similar to the tow hook 104 and the housing 110, respectively, described herein and illustrated in FIG. 2A. As such, like reference numbers will be used to describe like parts. However, rather than the first detents 140, the inclined surfaces 144, and the second detents 142 being formed in the housing 110, as described in the tow hook assembly 102 illustrated in FIG. 2A, first detents 140A, inclined surfaces 144A, and second detents 142A are formed in the tow hook 104A. Additionally, rather than the biasing member 154 extending through the tow hook 104, as described in the tow hook assembly 102 illustrated in FIG. 2A, a pair of biasing members 154A extend from the housing 110A into the first detents 140A formed in the tow hook 104A.

With more particularity, as shown in FIG. 5, the tow hook assembly 102A includes the housing 110A and the tow hook 104A. The housing 110A includes the rear wall 112, the bottom wall 114, the upper wall 116 opposite the bottom wall 114, and the pair of side walls 118 that define the open interior 120. In embodiments, the housing 110A is a one-piece, monolithic structure. In other embodiments, the upper wall 116 is separately attached to the rear wall 112 and the pair of side walls 118. In other embodiments, each of the rear wall 112, the bottom wall 114, the upper wall 116, and the pair of side walls 118 are separately attached to one another. Accordingly, in embodiments, the housing 110A may not be a one-piece, monolithic structure. The aperture 122 is formed in the housing 110 opposite the rear wall 112 to permit the tow hook 104A to move between an extended position, as shown in FIG. 5, and a retracted position, as shown in FIG. 6, relative to the housing 110A. Accordingly, the aperture 122 has any suitable geometry corresponding to a shape of the tow hook 104A such as, for example, circular, rectangular, or other regular or irregular shapes.

Referring still to FIG. 5, the housing 110A is mounted to the frame member 124, such as the bumper beam, a crush box, or the like, in any suitable manner such as, for example, mechanical fasteners, clips, adhesive, welding, or the like. In embodiments, the upper wall 116 of the housing 110A is fixed to the frame member 124. As shown in FIG. 5, the frame member 124 is provided rearward of the bumper cover 108. The longitudinal rail 126 extends from the frame member 124 in the vehicle longitudinal direction opposite the bumper cover 108.

The tow hook 104A includes the tow hook body 128 having the front end 130 and the rear end 132 opposite the front end 130, the upper surface 129, and the lower surface 131 opposite the upper surface 129. As discussed herein, the outer peripheral shape of the tow hook body 128 has a shape corresponding to the aperture 122 formed in the housing 110A such that the tow hook body 128 is permitted to move through the aperture 122 and within the open interior 120 of the housing 110A. In embodiments, the hole 134 is formed in the tow hook body 128 proximate the front end 130 to permit an attachment member such as, for example, a towing strap, hitch, or the like, to be secured to the tow hook 104A. In other embodiments, the front end 130 of the tow hook body 128 itself may have any suitable shape or size such as, for example, a curved or hooked portion such that a tow strap may be secured directly thereto. In some embodiments, the front end 130 of the tow hook 104A has the shape of a hook.

Referring still to FIG. 5, the tow hook 104A includes a first detent 140A formed in at least one of the upper surface 129 of the tow hook body 128 of the tow hook 104A, and the lower surface 131 of the tow hook body 128 of the tow hook 104A. In embodiments, the second detent 142A is formed on the at least one of the upper surface 129 of the tow hook body 128 of the tow hook 104A, and the lower surface 131 of the tow hook body 128 of the tow hook 104A forward of the first detent 140A in the vehicle longitudinal direction. Additionally, in embodiments, the inclined surface 144A is formed on the at least one of the upper surface 129 of the tow hook body 128 of the tow hook 104A, and the lower surface 131 of the tow hook body 128 of the tow hook 104A, and extends between the first detent 140A and the second detent 142A.

As shown, the first detent 140A, the second detent 142A, and the inclined surface 144A are formed on each of the upper surface 129 of the tow hook body 128 of the tow hook 104A and the lower surface 131 of the tow hook body 128 of the tow hook 104A. However, it should be appreciated that, in embodiments, the first detent 140A, the second detent 142A, and the inclined surface 144A are formed on the upper surface 129 of the tow hook body 128 of the tow hook 104A or the lower surface 131 of the tow hook body 128 of the tow hook 104A. In other embodiments, the first detent 140A, the second detent 142A, and the inclined surface 144A are formed on one or more side surfaces of the tow hook body 128 extending between the upper surface 129 and the lower surface 131 of the tow hook body 128.

The inclined surface 144A is oriented at an acute angle θ2 relative to a longitudinal plane P2 of the upper surface 129 of the tow hook body 128 extending parallel to the longitudinal axis L of the tow hook 104A, i.e., parallel to the vehicle longitudinal direction. In embodiments, the acute angle θ2 is 20 degrees+/−10%. In embodiments, the acute angle θ2 is 20 degrees+/−20%. In embodiments, the acute angle θ2 is 20 degrees+/−30%. In embodiments, the acute angle θ2 is 20 degrees+/−40%. In embodiments, the acute angle θ2 is 20 degrees+/−50%. Additionally, the inclined surface 144A tapers inwardly toward the longitudinal axis L in a direction from the first detent 140A to the second detent 142A. In embodiments, as shown in FIG. 5, the angle at which the inclined surface 144A extends from the first detent 140A to the second detent 142A is not constant. For example, the inclined surface 144A may include a first inclined surface portion 145A extending from the second detent 142A oriented at the acute angle θ2 and a second inclined surface portion 147A extending between the first inclined surface portion 145A and the first detent 140A oriented substantially parallel to the longitudinal plane P2.

Referring still to FIG. 5, a biasing cutout 152A is formed within at least one of the inner surface 119 of the upper wall 116 of the housing 110A, and the inner surface 121 of the bottom wall 114 of the housing 110A. A biasing member 154A is provided within the biasing cutout 152A. In embodiments, the biasing member 154A includes a spring 156A and a bearing 162A provided at an end of the spring 156A.

As shown in FIG. 5, a biasing cutout 152A is formed within each of the inner surface 119 of the upper wall 116 of the housing 110A, and the inner surface 121 of the bottom wall 114 of the housing 110A. As such, the biasing member 154A is provided within each biasing cutout 152A such that the bearing 162A may be received within the first detent 140A when the spring 156A is in an extended position and the tow hook 104A is in an extended position, as shown in FIG. 5.

Similar to operation of the tow hook assembly 102 illustrated in FIG. 2A and described herein, when a force is applied against the front end 130 of the tow hook body 128 exceeding a biasing force of the dampen member 170, the tow hook 102A moves in the direction of arrow A1. Such movement causes the springs 156A to compress, allowing the bearings 162A to move out of the first detents 140A, and slide along the inclined surface 144A. Once the tow hook 102A has moved into the retracted position, the springs 156A are permitted to extend and move the bearings 162A into the second detents 142A, thereby locking the tow hook 104A in the retracted position, as shown in FIG. 6.

As described herein with respect to the tow hook assembly 102 illustrated in FIG. 2A, the tow hook 104A is permitted to move in the direction of arrow A2 to return to the extended position either by manual operation by a user or once the force applied against the front end 130 of the tow hook body 128 no longer exceeds the biasing force of the dampen member 170. During movement of the tow hook 104A toward the extended position, the springs 156A compress, allowing the bearings 162A to move out of the second detents 142A, and slide along the inclined surface 144A. Once the tow hook 102A has moved into the extended position, the springs 156A are permitted to extend and move the bearings 162A into the second detents 142A, thereby locking the tow hook 104A in the extended position, as shown in FIG. 5.

From the above, it is to be appreciated that defined herein is a tow hook assembly including a housing having an aperture formed in a front wall of the housing, a tow hook at least partially extending through the aperture and movable between an extended position and a retracted position, and a biasing member prohibiting movement of the tow hook from the extended position to the retracted position until a force exceeding a predetermined force threshold is applied against a front end of the tow hook.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A tow hook assembly comprising:
- a housing having an aperture formed in a front wall of the housing;
- a tow hook at least partially extending through the aperture and movable between an extended position and a retracted position; and
- a biasing member extending at least partially though the tow hook and configured to prohibit movement of the tow hook from the extended position to the retracted position until a force exceeding a predetermined force threshold in a direction opposite a towing direction is applied against a front end of the tow hook.

2. The tow hook assembly of claim 1, wherein, when the tow hook is in the extended position, the tow hook extends farther outward from the housing than when the tow hook is in the retracted position.

3. The tow hook assembly of claim 1, wherein, when the tow hook is in the extended position, a portion of the biasing member is received within a first detent formed in the housing.

4. The tow hook assembly of claim 3, wherein, when the tow hook is in the retracted position, the portion of the biasing member is received within a second detent formed in the housing.

5. The tow hook assembly of claim 4, wherein the housing includes an inclined surface formed in an inner surface of the housing extending between the first detent and the second detent.

6. The tow hook assembly of claim 5, wherein the inclined surface is oriented at an acute angle relative to a plane extending parallel to a longitudinal axis of the tow hook.

7. The tow hook assembly of claim 6, wherein the acute angle is 20 degrees+/−50%.

8. The tow hook assembly of claim 4, wherein the biasing member includes a spring and a bearing provided at an end of the spring.

9. The tow hook assembly of claim 1, wherein the predetermined force threshold is 1 kN+/−50%.

10. The tow hook assembly of claim 1, further comprising a pin extending through a slot formed in one of the housing and the tow hook, the slot having a front end and a rear end opposite the front end, and a pin channel formed in the other of the housing and the tow hook, the pin limiting movement of the tow hook between the extended position as the pin abuts against the front end of the slot and the retracted position as the pin abuts against the rear end of the slot.

11. The tow hook assembly of claim 10, wherein the slot is formed in a side wall of the housing and the pin channel is formed in the tow hook, the pin is received within the pin channel and movable along the slot as the tow hook moves between the extended position and the retracted position.

12. A tow hook assembly comprising:

a housing having an aperture formed in a front wall of the housing;

a tow hook at least partially extending through the aperture and movable between an extended position and a retracted position, a first detent formed in a surface of the tow hook, a second detent formed in the surface of the tow hook, and an inclined surface extending from the first detent to the second detent; and a biasing member extending from the housing and configured to prohibit movement of the tow hook from the extended position to the retracted position until a force exceeding a predetermined force threshold in a direction opposite a towing direction is applied against a front end of the tow hook, wherein a portion of the biasing member is received within the first detent when the tow hook is in the extended position, wherein the portion of the biasing member is received within the second detent when the tow hook is in the retracted position.

13. The tow hook assembly of claim 12, wherein, when the tow hook is in the extended position, the tow hook extends farther outward from the housing than when the tow hook is in the retracted position.

14. The tow hook assembly of claim 13, wherein the inclined surface is oriented at an acute angle relative to a plane extending parallel to a longitudinal axis of the tow hook.

15. The tow hook assembly of claim 14, wherein the acute angle is 20 degrees+/−50%.

16. The tow hook assembly of claim 12, wherein the biasing member includes a spring and a bearing provided at an end of the spring.

17. The tow hook assembly of claim 12, wherein the predetermined force threshold is 1 kN+/−50%.

18. A vehicle comprising:

a frame member;

a bumper cover positioned forward of the frame member in a vehicle longitudinal direction, an opening formed in the bumper cover; and a tow hook assembly attached to the frame member, the tow hook assembly comprising:

a housing having an aperture formed in a front wall of the housing;

a tow hook at least partially extending through the aperture and movable between an extended position and a retracted position, the tow hook extending through the opening formed in the bumper cover when in the extended position; and a biasing member extending at least partially though the tow hook and configured to prohibit movement of the tow hook from the extended position to the retracted position until a force exceeding a predetermined force threshold in a direction opposite a towing direction is applied against a front end of the tow hook.

19. The vehicle of claim 18, wherein:

when the tow hook is in the extended position, a portion of the biasing member extending from the housing is received within a first detent formed in the tow hook; and when the tow hook is in the retracted position, the portion of the biasing member extending from the housing is received within a second detent formed in the tow hook.

* * * * *